(12) United States Patent
Rieger et al.

(10) Patent No.: US 11,267,359 B2
(45) Date of Patent: Mar. 8, 2022

(54) METHOD FOR ELECTRICALLY CHARGING AN ENERGY STORAGE OF A MOTOR VEHICLE, CONTROL DEVICE, AND MOTOR VEHICLE

(71) Applicant: AUDI AG, Ingolstadt (DE)

(72) Inventors: Bernhard Rieger, Ingolstadt (DE); Frank Meller, Buxheim (DE); Martin Ehrenreich, Aiglsbach (DE); Silvia Gramlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 82 days.

(21) Appl. No.: 15/931,894

(22) Filed: May 14, 2020

(65) Prior Publication Data
US 2020/0361332 A1    Nov. 19, 2020

(30) Foreign Application Priority Data

May 14, 2019    (DE) .......................... 102019207002.7

(51) Int. Cl.
*B60L 53/62*    (2019.01)
*B60L 53/31*    (2019.01)
(Continued)

(52) U.S. Cl.
CPC .............. *B60L 53/62* (2019.02); *B60L 53/31* (2019.02); *B60L 53/64* (2019.02); *B60L 58/12* (2019.02);
(Continued)

(58) Field of Classification Search
CPC .......... B60L 53/62; B60L 53/31; B60L 53/64; B60L 58/12; B60L 2240/545; B60L 2240/549; B60L 2250/12; B60L 58/13; B60L 58/10; B60Y 2300/91; B60Y 2200/91; B60Y 2200/92; B60K 6/28;
(Continued)

(56) References Cited

U.S. PATENT DOCUMENTS

| 2009/0222143 A1* | 9/2009 | Kempton ................ H02J 9/062 700/291 |
| 2009/0326749 A1* | 12/2009 | Uchida ................... B60L 58/16 701/22 |

(Continued)

FOREIGN PATENT DOCUMENTS

| DE | 102011109422 A1 | 2/2013 |
| DE | 102014206926 A1 | 10/2015 |

(Continued)

OTHER PUBLICATIONS

German Search Report dated Feb. 27, 2020 in corresponding German Application No. 10 2019 207 002.7; 16 pages; Machine translation attached.

*Primary Examiner* — Nha T Nguyen
(74) *Attorney, Agent, or Firm* — Maier & Maier, PLLC

(57) ABSTRACT

A method for electrical charging of an energy storage of a motor vehicle at a motor vehicle external charger, wherein at least one charging constraint specified by a user of the motor vehicle specifically for the upcoming charging process of the energy storage is detected, and a charging current for the upcoming charging process is determined depending on the at least one charging constraint, and the charging process is performed depending on the determined charging current.

10 Claims, 1 Drawing Sheet

(51) Int. Cl.
    *B60L 53/64*         (2019.01)
    *B60L 58/12*         (2019.01)
    *B60K 6/28*          (2007.10)
    *B60H 1/00*         (2006.01)

(52) U.S. Cl.
    CPC ............ *B60H 1/00778* (2013.01); *B60K 6/28* (2013.01); *B60Y 2200/91* (2013.01); *B60Y 2200/92* (2013.01); *B60Y 2300/91* (2013.01)

(58) Field of Classification Search
    CPC ... B60H 1/00778; Y04S 30/14; Y02T 90/167; Y02T 10/7072; Y02T 90/12; Y02T 10/70
    See application file for complete search history.

(56) References Cited

U.S. PATENT DOCUMENTS

| | | | |
|---|---|---|---|
| 2011/0156652 A1* | 6/2011 | Kishiyama | B60L 53/305 320/132 |
| 2013/0257144 A1* | 10/2013 | Caldeira | B60L 50/60 307/9.1 |
| 2013/0300361 A1 | 11/2013 | Origuchi et al. | |
| 2014/0091747 A1* | 4/2014 | Uyeki | H02J 13/00028 320/101 |
| 2015/0054466 A1* | 2/2015 | Kinomura | B60L 53/63 320/134 |
| 2015/0326037 A1* | 11/2015 | Borhan | B60L 58/16 320/162 |
| 2016/0221455 A1* | 8/2016 | Ando | B60L 58/12 |
| 2017/0045888 A1* | 2/2017 | Mattila | B60L 53/36 |
| 2017/0129361 A1* | 5/2017 | Scaringe | B60L 3/12 |
| 2018/0009318 A1* | 1/2018 | Han | B60L 50/40 |
| 2019/0143832 A1* | 5/2019 | Birek | B60L 53/14 701/22 |
| 2019/0217739 A1* | 7/2019 | Sinha | B60L 53/665 |
| 2019/0275892 A1* | 9/2019 | Williams | B60L 53/64 |
| 2020/0269719 A1* | 8/2020 | Aykol | B60L 53/00 |
| 2021/0094435 A1* | 4/2021 | Rechkemmer | B60L 53/66 |

FOREIGN PATENT DOCUMENTS

| | | |
|---|---|---|
| DE | 102016206743 A1 | 10/2017 |
| EP | 2410494 A1 | 1/2012 |
| WO | 2014/048463 A1 | 4/2014 |

* cited by examiner

METHOD FOR ELECTRICALLY CHARGING AN ENERGY STORAGE OF A MOTOR VEHICLE, CONTROL DEVICE, AND MOTOR VEHICLE

FIELD

The disclosure relates to a method for electrically charging an energy storage of a motor vehicle at a motor vehicle external charger. The disclosure also includes a control means for controlling a charging process and a motor vehicle.

BACKGROUND

An essential aspect in the context of electric vehicles is, first of all, the provision of so-called fast-charging functions. Here, the challenge is to charge the energy storage of such an electric vehicle, in particular a HV (high-voltage) battery, as quickly as possible without damaging it. The trend is towards ever higher charging power, for example, of more than 200 kilowatts. This allows in principle to charge the high-voltage battery with a large amount of energy within a short time and thus ensure a large range.

It would be desirable however, to further optimize charging methods for charging energy storage systems of motor vehicles.

Document DE 10 2016 206 743 A1 describes a control unit for the operation of a hybrid vehicle, enabling a user to enter a target state of charge for the energy storage or activate an automatic adjustment of the state of charge of the energy storage. A driving mode can then be selected depending on the user input, according to which the energy storage of the motor vehicle is charged accordingly while driving with the internal combustion engine of the motor vehicle. This is to provide a predictive energy management of the vehicle. However, a charging process of the energy storage at a motor vehicle external charger cannot be optimized in this manner.

Furthermore, EP 2410494 A1 describes a method for operating a charging station, according to which an identification means is used by a user of the motor vehicle when entering a parking facility, which means provides a unique identifier by which a power output device of the charging station is unlocked and is then ready for a charging process. The power output device may also have a respective input device via which charging parameters can be specified by the user. But this document shows no way in which such a charging process can be optimized.

Furthermore, at least document DE 10 2014 206 926 A1 describes a method for adjusting a charging parameter of a traction battery of a vehicle, wherein a charging station is automatically detected and parameters of the charging station are determined, and wherein the charging parameters as a function of the parameters of the charging station and/or a parameter of previous charging processes or driver preferences are automatically confirmed or offered for setting. Charging parameters of previous charging processes and driver preferences can be stored in a memory. The charging parameters are for example the maximum charging current, charging time, air conditioning modes, voltage type, and so on. In this case, the respective charging station where the previous charging processes have taken place is also associated with the previous charging processes. The parameters of the charging station then include, for example, the charging voltage, the maximum charging current, the price, and so on. By resorting to such historical load data the user should be largely relieved of a manual input of charging parameters. But this document also shows no way in which such a charging process can be optimized.

SUMMARY

It is therefore the object of the present invention to provide a method for electrical charging of an energy storage of a motor vehicle at a motor vehicle external charger, a control device and a motor vehicle, which enable an increase in an efficiency of a charging process for charging the energy store of the motor vehicle and in particular a situation-adapted optimization of a charging strategy.

In a method according to the invention for electrically charging an energy storage of a motor vehicle at a motor vehicle external charger, at least one charging constraint specified by a user of the motor vehicle specifically for an upcoming charging process for charging the energy storage and a charging current for the upcoming charging process depending on the at least one detected charging constraint are detected, and the charging process is performed depending on the determined charging current.

The invention is based on the finding that charging the energy storage at the maximum possible charging power does not necessarily also lead to the fastest possible execution of the charging process. This is because a high charging power results in faster heating up of the energy storage, such as a high-voltage battery of the motor vehicle. If the battery temperature is too high, the charging current must be reduced to protect the individual battery cells. This can lead to the charging process taking longer at an initially high charging power than it would take if the charging power had been selected to be lower in the first place. If, for example, a user in a current situation does not wish to fully charge the energy storage but only slightly increase the current state of charge of the energy storage, for example to a charge level of 30 percent, or if the user in any case has very little time for charging, charging can be performed at the full charging power, that is, the maximum possible charging power, in such situations, since due to the short charging time there is no need to fear or expect that a maximum permissible battery temperature is exceeded, and the resulting reduction in charging capacity will not be necessary. But if a user wishes to charge the energy storage very much in a charging process, such as to a level of 90 percent, the user can select a lower charging power than the maximum possible power from the start, such that, even with these anticipated longer charging times, a certain battery temperature which would require a reduction in charging power is not exceeded. In this way, the charging time can be effectively shortened, even when not charging at the maximum possible charging power. The invention now makes use of these findings in that a user can specify precisely such charging constraints for a specific upcoming charging process. The consideration of these constraints, or at least one thereof, allows the determination of a charging current through which the subsequently performed charging process can be made particularly efficient even before the charging process. In other words, taking into account at least one user-specified charging constraint allows an optimized design of the charging process or charging strategy, respectively. Such optimization can be performed with respect to charging time, as was illustrated in the above example, but also with respect to other target variables, such as costs, power loss or the like, which will be explained in more detail later.

The energy storage of the motor vehicle is preferably a battery, in particular a high-voltage battery, of the motor vehicle. The vehicle itself can, for example, be an electric vehicle and/or hybrid vehicle. The motor vehicle external charger can be, for example, a charging station or inductive charging plate, a wall box, a home power supply, or the like. In general, the charging device can be a public charging device or a private charging device of the user of the motor vehicle. Furthermore, the charging device can be a conductive charging device, for example, for wired charging of the motor vehicle, or a charging device which is designed for the non-contact transfer of energy to the energy store of the motor vehicle, such as a capacitive or inductive charging device.

To give the user an opportunity for specifying the at least one charging constraint, an appropriate input option, in particular a user interface, may be provided, via which the user can enter at least one charging constraint. Such an input option can preferably be provided by the vehicle itself, for example by an operator display in the motor vehicle, or by the charging device and/or by a mobile communication device of the user. The determination of the charging current is preferably performed by the motor vehicle, particularly by a control device of the motor vehicle. If the charging constraint is detected, for example, by a user interface of the charger and/or a mobile communication device of the user, this user-specified at least one charging constraint is preferably communicated to the vehicle or its control device of by the charger and/or the mobile communication device.

Furthermore, determining the charging current can indirectly be understood as determining a charging power. In other words, a charging power may be determined depending on the at least one detected charging constraint, depending on which the charging process is performed, wherein the charging current inevitably also results from the determined charging power with which the charging process is performed, since the charging voltage is usually specified and typically remains constant during the charging time.

Furthermore, the charging process can be performed depending on the determined charging current, such that the charging current supplied to the energy storage during the charging process does not necessarily be constant throughout the charging process, but may vary, for example. Determination of the charging current does not necessarily mean a single current value, but may include, for example, the determination of a charge current varying over time. Also, the charging process does not have to be performed completely at this determined charging current; instead, a re-adjustment of the charging current can be made during charging, in particular in accordance with a control loop, as will be explained in more detail below. However, a charging current that matches the determined charging current is supplied to the energy storage at least at the beginning of the charging process. In other words, the charging current determined for charging the energy storage device is set as charging current at least at the beginning of the charging process.

In an advantageous embodiment of the invention, the at least one charging constraint constitutes at least one of the following:

a target state of charge of the energy storage, which the energy storage should at least have after the charging process;

a minimum range, which should be at least reachable with the motor vehicle after the charging process under specified driving conditions;

a target charging time, which the charging process should at least and/or at most take;

a price and/or efficiency condition, according to which costs and/or a power loss of the charging process is to be minimized;

an air-conditioning constraint, which indicates whether an interior of the motor vehicle is to be air-conditioned during the charging process.

It is particularly advantageous when a target state of charge of the energy storage or a minimum range can be specified by the user. These two variables, target state of charge and minimum range, are substantially equivalent. If the user, for example, specifies a minimum range which should at least be reachable after charging with the motor vehicle under specified driving conditions, a target state of charge equivalent to this specified minimum range is determined by the motor vehicle, and this determined target state of charge is set as at least one user-specified charging constraint. The option to specify a minimum range instead of directly specifying a target state of charge is more user friendly since the user does not estimate the state of charge that would be required to achieve a specific range. The specified driving conditions can represent predefined standard driving conditions and specify, for example, an average energy consumption per distance unit. Such specified driving conditions can also be determined based on an individual user's historical driving data user customization also. In other words, the power consumption per distance unit traveled can also be specified by such historical driving data. Numerous different options are known from the prior art how a minimum state of charge or target state of charge of the energy storage can be determined based on a specified minimum range which is to be reachable with a motor vehicle under given driving conditions, such that we will not go into detail here about that. Ultimately, such a target state of charge of the energy storage can be specified by the user, in particular, either directly by entering such a target state of charge or indirectly by specifying a desired minimum range. This specification or charging constraint is particularly useful to optimize the charging strategy. It is precisely this target state of charge that dominates the required charging time significantly as well as the resulting thermal heating of the energy storage during the charging process. For example, if the user specifies a relatively small target state of charge, the full charging power can be requested to minimize the charging time, for example, whereas at a relatively high target state of charge, the charging power can also be reduced due to thermal effects from a maximum possible charging power to minimize the charging time. If it is already known in advance whether the user wants to fully charge his motor vehicle or only wishes a partial charge, particularly a low partial charge, the charging process can be performed much better and more efficiently.

Specification of a target charging time is particularly advantageous. If the user knows, for example, that he is does not need his motor vehicle for at least 45 minutes, this time can be used to charge the energy storage and allows to charge the energy storage using significantly less power than would be required if only 25 minutes of charging time were available to charge the energy storage. This in turn allows to significantly reduce the load on the energy storage during charging. In addition, the power loss occurring as waste heat and the cooling demand are reduced as well, which can increase vehicle efficiency. Thus not only an optimization is provided with respect to the charging rate, but also with respect to charging efficiency, for example. Accordingly, a user can directly specify such a price and/or efficiency condition. According to such a condition, the user can specify that the charging process is to be optimized with respect to energy efficiency. Accordingly, the charging current can be determined such that, for example, the power loss during the charging process is minimized when charging with this charging current. Such a minimization of power loss can typically be achieved by choosing the smallest possible charging power and accordingly the lowest possible charging current. A small charging current typically has a positive effect on the load on the energy storage and thus positively affects its service life. By minimizing the power loss, the price of the charging process can typically be minimized as well, particularly for a given state of discharge. Such a price may on the one hand refer to the charging costs payable at a public charging station or to the electricity price when charging the motor vehicle at a home charging device, such as a wall box or a mains flow connection. To still facilitate charging in an appropriate charging time, a minimum value can be specified for the charging current below which the charging current will not drop during the charging process. Through such a price or efficiency condition, the user can also specify that a charging strategy is to be provided depending on a billing mode of the charger. If such a billing mode is not based on the power charged but for example on the charging time, or if the user has a some type of flat electricity rate, an Other Variable can be optimized, for example, the charging time be minimized instead of the power, particularly the power loss, by appropriate selection of the charging current. If the price for the charged current is determined by a different variable than the power, the charging current can be selected depending on the power billing mode in such a manner that the price for the charged power is minimized. In addition to such an efficiency condition, the user can at the same time also specify a target state of charge and/or target charging time. If a target state of charge is specified, for example, the respective energy storage can be charged until the target state of charge is reached, as energy-efficiently as possible. Energy efficiency can also be optimized in this manner if a target charging time is specified, which means that the energy efficiency is optimized within the specified target charging time.

Furthermore, it is also advantageous if the user can specify an air conditioning constraint. This condition can indicate whether an interior of the motor vehicle is to be air-conditioned during the charging process. If this is the case, respectively less cooling capacity to cool the energy storage is available during the charging process. This can then advantageously be taken into account when determining the charging current. It is particularly selected such that a specified threshold temperature for the energy storage is not exceeded during the entire charging process, particularly without having to temporarily reduce the charging power or the charging current to ensure that this threshold temperature is not exceeded. By specifying such an air-conditioning constraint, a maximum possible charge current can be determined much more precisely and thus in turn a much better situation adjustment is provided.

As already mentioned, the user can not only specify one of the above charging constraints, but, for example, several of these charging constraints. It is furthermore advantageous, if the user has specified both a target charging time and a target state of charge or a minimum range, that a selection option for the user to select the target state of charge and/or the minimum range is limited depending on the target charging time specified by the user, and/or a selection option for the user to select the target charging time is limited depending on the target state of charge and/or depending on the minimum range specified by the user.

In other words, if a user specified, for example, a target state of charge, such a target state of charge is usually not reached in any desired short charging time since the maximum achievable charging power is limited at the top. On the other hand, if the user, for example, specifies a relatively short target charging time, not every arbitrarily high target state of charge can be achieved even at the maximum possible charging power, which of course depends on the initial state of charge of the energy storage. In other words, the maximum chargeable amount into the energy storage during such charging time charge is limited here. For example, the user may first specify a target state of charge and a target charging time, and the motor vehicle or its control device, respectively, then checks if this specified target data is compatible with each other or can be achieved simultaneously. If this is not the case, the user can be prompted accordingly, to modify the target charging time or the target state of charge as the target variables. But the user may also first specify a setting, such as the target charging time, and then be provided with correspondingly limited options he can specify as selection options for the target state of charge.

This has the great advantage that a user can be notified at the same time if specific target specifications are not compatible. As already mentioned, it is furthermore advantageous if the limitation of the relevant selection option is determined depending on a currently possible maximum charging power with which the energy storage can be maximally charged during the upcoming charging process. Specifically when it comes to the target state of charge and the target charging time, the maximum possible charging power or the equivalent maximum possible charging current constitutes the limiting factor with respect to their compatibility. That charging power for which the motor vehicle is specified can be considered the maximum possible charging power. It is advantageous, however, if such a maximum possible charging power is determined taking into account other parameters, particularly the battery temperature, as will be explained in more detail below. Accordingly, the currently possible maximum charging power with which the energy storage can be charged during the upcoming charging process can deviate from the maximum possible charging power specified for the motor vehicle, particularly can be smaller than it. For example, this currently possible maximum charging power may be defined such that the threshold temperature for the energy storage mentioned above is not exceeded in the entire charging process when charging at such maximum possible charging power or the corresponding maximum possible charging current and there is no need to temporarily reduce the charging power or the charging current, respectively.

Conversely, it may well be that, even if the user specifies a target state of charge and a target charging time, both target specifications can easily be harmonized, yet there is still scope for optimization, for example with respect to the energy efficiency of the charging process. For example, the targets specified can also be achievable even if the charging is not performed at the currently possible maximum charge or currently possible maximum charging current. In this case, the charging current can be determined as the lowest at which the targets specified can still be reached. This means that the targets specified can advantageously be achieved and at the same time the energy efficiency of the charging process can be optimized to minimize the burden on the energy storage and the cost of the charging process.

According to another advantageous embodiment of the invention, it is particularly advantageous if an optimization variable to be optimized depending on the at least one charging constraint while maintaining the at least one charging constraint is specified and the charging current is determined depending on the specified optimization variable. For example, the user can specify the target state of charge and the target charging time as well as, for example, an air-conditioning constraint, as the charging constraints. The charging current can then be determined within these specified constraints in such a manner that, for example, the energy efficiency is optimized as the optimization variable, that is, the power loss occurring during the charging process is minimized. Conversely, the user can also specify that he is not interested in optimizing energy efficiency and that a specific target state of charge is to be reached. Accordingly, for example, the charging time can be specified as an optimization variable, and moreover, the charging current can be selected such that the charging time for the charging process is minimized. The state of charge can be maximized as an optimization variable even with a specified charging time. In this way, at least one optimization variable can always be optimized under the charging constraints specified. It can therefore be specified in advance which optimization variable is to be optimized when specifying which charging constraints, that is, can be specified by the control device of the motor vehicle itself or by the user, at least if there is a certain margin left based on the charging constraints specified by the user.

It is therefore particularly advantageous if the state of charge of the energy storage is maximized as the optimization variable during the charging process, particularly at least if no target state of charge and/or minimum range is specified as a charging constraint, particularly at least if no target charging time is specified as a charging constraint and/or charging costs and/or a power loss are minimized during charging. If the user, for example, does not specify a target state of charge but only a target charging time, the target state of charge can be maximized while complying with the target charging time. The same applies vice versa, if the user only specifies a target state of charge but no target charging time. In this case, the charging current can be determined such that the charging time is minimized. If the user specifies both variables, for example, and if there is still room to maneuver, the charging current can be selected such that the charging costs and/or the power loss are minimized while maintaining both target specifications. But the user can also specify the charging costs and/or the power loss or their minimization as the highest priority, such that the charging process is designed, accordingly, particularly the charging current is selected such that the power loss or price is minimized, preferably while maintaining a specific minimum charging current. Thus, one of the optimization variables can be optimized and the charging strategy optimally adapted to the situation while advantageously taking into account the user's wishes as specified by means of the charging constraints.

In another advantageous embodiment of the invention, at least one current state parameter, particularly a current temperature of the energy storage, is determined and the charging current is determined depending on the at least one current state parameter. The consideration of such a state parameter, particularly the current temperature of the energy storage, advantageously allows to determine the charging current such that it does not lead to an excessive temperature increase of the energy storage during the entire charging process, particularly not to such a temperature increase that results in exceeding the threshold temperature specified for the energy storage. Accordingly, the maximum possible charging current or the maximum possible charging power, respectively, which may be lower than the maximum permissible charging power for which the motor vehicle is specified, can always be determined in this way in a particularly situation-adapted manner. In determining such a currently possible maximum charging power or a corresponding currently possible maximum charging current, it is not only advantageous to take into account the current temperature of the energy storage, but also, for example, the air-conditioning constraint described above to determine how much cooling capacity to cool the energy storage is available during the charging process. The charging strategy can advantageously be further optimized.

In a further advantageous embodiment of the invention, it is checked during the charging process if the at least one specified charging constraint is maintainable, and if not, the charging current is changed or adjusted. Under certain circumstances the system may not only be check whether the specified charging constraints are maintainable, but also for example, whether the specified optimization variable can be optimized or further optimized while maintaining these charging constraints. For example, if it is found in the course of the charging process that the temperature increase of the energy storage will be less than predicted, then the charging current may be increased accordingly during the charging process, for example, to further minimize the charging time. If conversely found, for example, that the temperature increase of the energy storage during the charging process is greater than expected or predicted before the charging process, the charging current can be reduced accordingly to optimize specifications with respect to energy efficiency or costs of the charging process, even if no exceeding of the threshold temperature specified for the energy storage is to be expected. With such a control system, the charging current may advantageously still be adapted during the charging process to ensure that the at least one charging constraint is complied with and/or that a specified optimization variable is indeed optimized. Such an adjustment option during the charging process contributes to further optimizing the charging strategy.

Furthermore, the invention relates to a control device for controlling a charging process for electrically charging an energy storage of a motor vehicle at a motor vehicle external charger. The control device is adapted to determine a charging current for the upcoming charging process depending on at least one detected charging constraint specified by a user of the motor vehicle specifically for the upcoming charging process for charging the energy storage, and to perform the charging process depending on the determined charging current.

The advantages described for the method according to the invention and its embodiments apply likewise to the control device according to the invention.

The invention also includes further developed embodiments of the control device according to the invention, having the features as described above in connection with the further developed embodiments of the method according to the invention. This is why the respective further developed embodiments of the control device according to the invention are not repeated here.

Furthermore, the invention also relates to a motor vehicle having a control device according to the invention or one of its embodiments.

The motor vehicle according to the invention is preferably designed as a motor car, particularly a passenger car or truck, or as a bus or motorbike.

BRIEF DESCRIPTION OF THE DRAWINGS

The disclosure also includes combinations of the features of the embodiments described.

Exemplary embodiments of the invention will be described below. Wherein.

DETAILED DESCRIPTION

Figure 1:
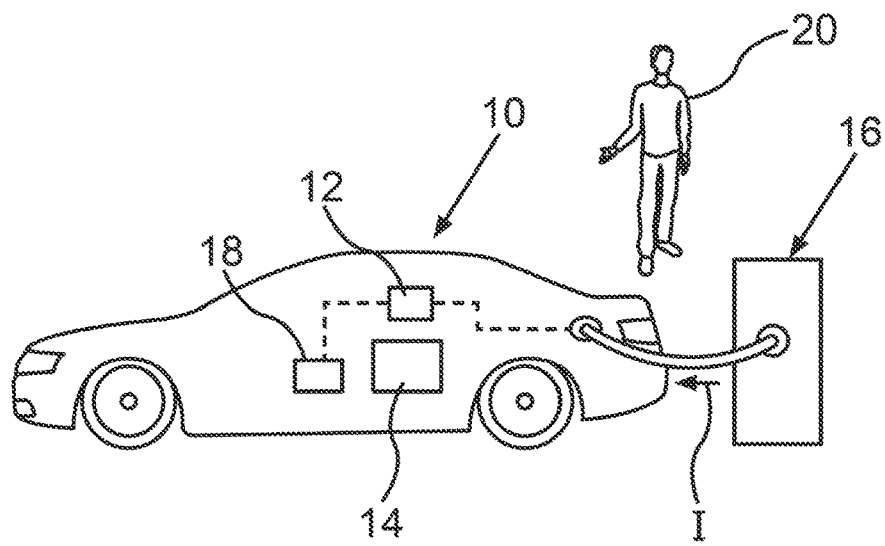
FIG. 1 is a schematic representation of a motor vehicle with a control device during a charging process at a motor vehicle external charger according to an embodiment of the invention.

The exemplary embodiments explained below are preferred embodiments of the invention. The components described in the exemplary embodiment represent individual features of the invention to be viewed separately, independently of each other, each of which further developing the invention independently. The disclosure therefore is to include other combinations of features of the embodiments than the ones shown. Furthermore, the embodiments described can be supplemented by other features of the features of the invention already described.

Like reference numerals in the figures designate elements having the same function.

FIG. 1 shows a schematic representation of a motor vehicle 10 with a control device 12 for controlling a charging process for charging an energy storage 14 of the motor vehicle 10 at a motor vehicle external charger 16 according to an exemplary embodiment of the invention. The motor vehicle 10 may further comprise an input device 18, such as a touch screen or other input means via which a user 20 of the motor vehicle may provide input and in particular via which the user 20 can specify at least one charging constraint specifically for an upcoming charging process for charging the energy storage 14. The respective at least one charging constraint that can be detected by means of this input device 18 can then be evaluated accordingly by the control device 12 of the motor vehicle 10, and based on this a charging current I can be determined with which the energy storage 14 is charged in the subsequent charging process. By taking into account at least one charging constraint specified by the user 20, a charging strategy for charging the energy storage device 14 can be optimized in a manner adapted to the situation. This will now be explained in further detail below with reference to FIG. 2.

Figure 2:
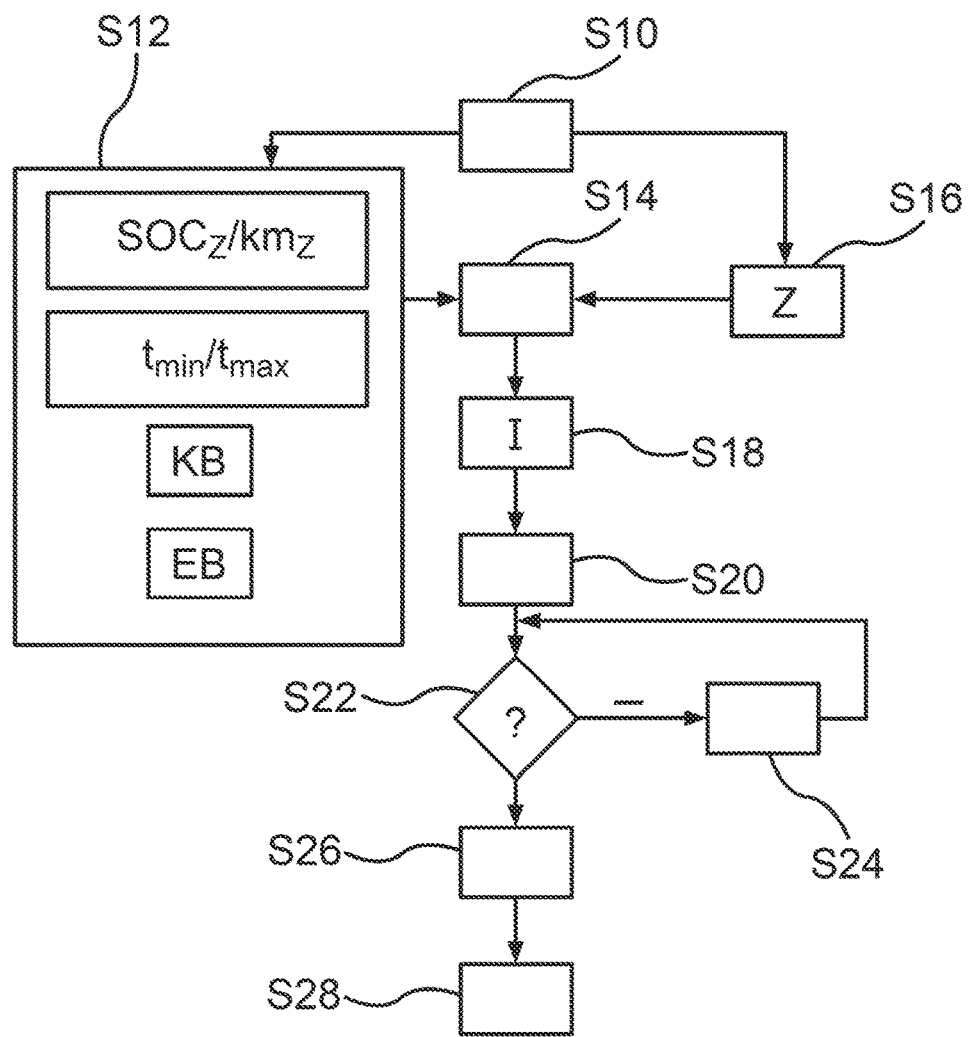
FIG. 2 is a flow chart illustrating a method for charging the energy storage of the motor vehicle according to an embodiment of the invention.

FIG. 2 shows a flow chart illustrating a method for electrically charging the energy storage 14 of the motor vehicle 10 at the motor vehicle external charger 16 according to an exemplary embodiment of the invention. The method starts at step S10, in which the charging process is started. At this time, the energy storage 14 of the motor vehicle is 10 is not yet charged. The start of the charging process can be, for example, a preparatory initialization process, in which, for example, the charging plug is plugged into the motor vehicle 10 and/or a start button is operated by the user 20, an authorization process is performed, or the control device 12 of the motor vehicle 10 is notified otherwise of the upcoming charging process, or said process is initiated by the control device 12, which is configured for executing a respective charging assistance function. Then a user query takes place in step S12. In the course of this users query, the user 20 is asked if he would like to specify certain charging constraints for the upcoming charging process. The user 20 can enter these charging constraints via the user interface, such as the input means 18 provided by the motor vehicle 10. Such charging constraints for example represent a target state of charge $SOC_Z$ which the energy storage 14 should at least have after the charging process, or a minimum range $km_Z$, which should be reachable by the motor vehicle 10 after the charging process and under the specified driving conditions. If the user 20 specifies such a minimum range $km_Z$, it may turn out that a corresponding minimum state of charge $SOC_Z$ can be determined. As another charging constraint, the user 20 can specify a minimum charging time $t_{min}$ and/or a maximum charging time $t_{max}$. This minimum charging time $t_{min}$ specifies here that the upcoming charging process may take at least the minimum charging time $t_{min}$ while the maximum charging time $t_{max}$ indicates that the upcoming charging process may take this maximum time $t_{max}$. The user 20 can also specify an air-conditioning constraint KB. This specifies, for example, if the interior of the motor vehicle 10 is to be air-conditioned during the charging process or not. The user 20 can also specify as another charging constraint a price and/or efficiency condition EB. According to such an efficiency condition EB, the user 20 may specify, for example, or indicate what priority the energy efficiency is to have during the charging process. For example, the user 20 may do this by selecting a selectable one of a plurality of stages, such as low energy efficiency, average energy efficiency and high energy efficiency. According to such an efficiency condition EB, the user 20 can, for example, alternatively or additionally specify or indicate whether to perform an adaptation of the charging strategy to minimize the charging costs in response to a current billing mode provided by the charger 16.

As a response to this user query in step S12, the user 20 may specify one or more or all of said charging constraints. Some of these parameters, such as the above-mentioned billing mode, need not necessarily be entered by the user 20, but for example, if available, can be read automatically from a database or a communication of the motor vehicle 10 with the charging station 16. If the user 20 specifies none of these charging constraints mentioned above, which does not necessarily have to be the case, a standard parameter for charging the motor vehicle 10 can be used. If the user then specifies one or more of said charging constraints, these charging constraints indicated or specified by the user 20 are transmitted to the control device 12 of the motor vehicle 10 in step S14. Furthermore, state variables Z of the energy storage 14, such as the current temperature of the energy storage 14, the current state of charge of the energy storage 14 and so can be detected in step S16 and also transmitted to the control device 12 in step S14. The control device 12 may further comprise a memory in which a specified function, illustration, a characteristic, a look-up table, an algorithm, or any other provision is deposited, according to which the control device 12 determines a charging current I in step S18 depending on said input variables, namely, depending on the charging constraints specified by the user 20 as well as optionally depending on the state parameters Z of the energy storage 14, as a function of which charging current the charging process for charging the energy storage 14 is performed. For this purpose, this charging process is then started according to step S20 and the energy store 14 is charged with the charging current I determined in step S18. In step S22, an optional check can be performed whether the specified target values are achievable, particularly if the charging constraints specified by the user 20 can be maintained. If this is not the case, the control device proceeds to step S24 in which a current adjustment is made. In other words, step S24 determines based on current state parameters Z of the energy storage 14, which can particularly be detected continuously during the charging process and also detected in advance, for example once again based on the function, the characteristic, the algorithm, or the like described above, which charging current must be set to achieve the charging constraints specified by the user and/or which specific charging constraints thereof can be further optimized, such as state of charge, charging time, or energy efficiency. This process can be carried out in a repeatedly executed control loop. This means that the charging current newly determined in step S24 can be set and the energy storage 14 can be charged accordingly, and control device can check again in step S22 if the target variables now specified can be achieved. If this is the case, the charging process with the adjusted charging current is continued in step S26. Another check according to step S22 can once again follow, but this is not shown explicitly once again in FIG. 2 for the sake of clarity. The charging process is then ultimately continued until the charging process is terminated in step S28 according to a specific termination condition. This termination condition may for example be that the target values, which were specified as the charging constraints by the user 20, have been achieved and/or any abortion criterion is met, for example, when the user 20 stops the charging process prematurely for any other reasons.

According to this method described, the user 20 now advantageously has the option to enter certain parameters before the charging process starts, namely the charging constraints mentioned above to the start of the charging process parameters, and thus specify these constraints for the control device 12 to control the charging process. The user can for example specify the range after the charging process or the target state of charge as well as the charging time required, and optionally other constraints. Now the charging process can be performed in an optimal manner for the customer and, above all, for the energy storage 14. If the user 20 knows, for example, that he will not need the vehicle for at least 45 minutes, the battery can, that is, the energy storage 14, can be charged with a significantly lower current I than when the charging time should be only 25 minutes, for example. Thus, the load on the battery is reduced significantly. In addition, the power loss occurring as waste heat and the cooling demand are reduced, which can increase vehicle efficiency. Another effect is that, for example, at low target states of charge, for example, 30 percent state of charge (SOC), the full charging power is available, whereas at high target states of charge (for example, 90 percent SOC), the charging power can be reduced in favor of faster charging times due to thermal effects. This is due to the fact that high charging powers cause an even faster and higher heating of the battery. If the battery temperature is too high, which can particularly be detected as a state parameter Z, as described above, the charge current is in general reduced for the protection of the individual battery cells. This is undesirable as it may result in the charging process takes longer if a high amount of energy is to be charged at an initially high charging power than when the charging power is reduced from the outset. This can now be advantageously avoided by adhering to the charging constraints specified by the user, because adapting the process to these targets from the outset allows setting a charging power or the charging current I such that the temperature of the energy storage 14 does not exceed this critical temperature over the entire charging time, even without having to modify the charging power during the process.

In this way, for example, charging times can be minimized, but alternatively or additionally, other variables such as energy efficiency can be optimized. In addition, high charging powers namely damage the individual battery cells and cause greater energy losses due to higher power loss, which reduces efficiency. Taking into account the charging constraints specified by the user, an additional optimization of energy efficiency can be performed by a respective setting of the charging current while maintaining said charging constraints. The current billing mode can also be advantageously taken into account when setting the charging current. If available, certain parameters, particularly those which specify charging constraints, for example, said billing mode, can be automatically read using a database or by communicating with the charging station 16.

Overall, the examples show how the invention can provide an adaptive charging method for optimal charging processes for high-voltage batteries, which allows a situation-adapted optimization of the charging strategy through taking into account user-specifiable charging constraints.

The invention claimed is:

1. A method for electrically charging an energy storage of a motor vehicle at a motor vehicle external charger comprising:
    detecting at least one charging constraint specified by a user of the motor vehicle for an upcoming charging process of the energy storage,
    determining a charging current for the upcoming charging process is determined depending on the at least one charging constraint, and
    performing the upcoming charging process depending on the charging current determined,
    wherein the at least one charging constraint comprises both a target state of charge of the energy storage and a target charging time,
    wherein, after selection of a first of the target state of charge and the target charging time, selection options which are presented to the user to select a second of the target state of charge and the target charging time are restricted based on constraints imposed on the upcoming charging process by the first.

2. The method according to claim 1, wherein the at least one charging constraint further comprises at least one of the following:
    a minimum range, which is reachable with the motor vehicle after the upcoming charging process under specified driving conditions;
    a price and/or efficiency condition, according to which costs and/or a power loss of the charging process are minimized.

3. The method according to claim 1, wherein restriction of the second selection is determined depending on a currently possible maximum charging power up to which the energy storage can currently be charged during the upcoming charging process.

4. The method according to claim 1, wherein an optimization variable to be optimized during the upcoming charging process while maintaining the at least one charging constraint is specified depending on the at least one charging constraint, and the charging current is determined additionally depending on the specified optimization variable.

5. The method according to claim 4, wherein during the charging process, a state of charge of the energy storage is maximized as the optimization variable; and/or
    a charging time is minimized as the optimization variable; and/or charging costs and/or a power loss are minimized during charging.

6. The method according to claim 1, wherein at least one current status parameter of the energy storage is determined and the charging current is determined additionally depending on the at least one current status parameter .

7. The method according to claim 1, wherein a check is performed during the charging process if the at least one specified charging constraint is maintainable, and if not, the charging current is changed.

8. A control device for controlling a charging process for electrically charging an energy storage of a motor vehicle at a motor vehicle external charger,
   wherein the control device is adapted to determine a charging current for the upcoming charging process depending on at least one detected charging constraint specified by a user of the motor vehicle for the upcoming charging process for charging the energy storage, and to perform the upcoming charging process depending on the determined charging current,
   wherein the at least one charging constraint comprises both a target state of charge of the energy storage and a target charging time, and
   wherein after selection of a first of the target state of charge and the target charging time, selection options which are presented to the user to select a second of the target state of charge and the target charging time are restricted based on constraints imposed on the upcoming charging process by the first.

9. The method according to claim 1, wherein the at least one charging constraint further comprises an air conditioning constraint, selection of which by the user maintains an air conditioning of an interior of the motor vehicle during the upcoming charging process which results in a reduction of cooling capacity for the energy storage.

10. The control device according to claim 8, wherein the at least one charging constraint further comprises an air conditioning constraint, selection of which by the user maintains an air conditioning of an interior of the motor vehicle during the upcoming charging process which results in a reduction of cooling capacity for the energy storage.

* * * * *